United States Patent
Itano et al.

(10) Patent No.: US 10,837,512 B2
(45) Date of Patent: Nov. 17, 2020

(54) METHOD FOR MANUFACTURING VIBRATION ISOLATION APPARATUS

(71) Applicant: KURASHIKI KAKO CO., LTD., Kurashiki (JP)

(72) Inventors: Yuji Itano, Kurashiki (JP); Mineyuki Ohara, Kurashiki (JP)

(73) Assignee: KURASHIKI KAKO CO., LTD., Kurashiki (JP)

( * ) Notice: Subject to any disclaimer, the term of this patent is extended or adjusted under 35 U.S.C. 154(b) by 70 days.

(21) Appl. No.: 16/172,436

(22) Filed: Oct. 26, 2018

(65) Prior Publication Data

US 2019/0301556 A1 Oct. 3, 2019

(30) Foreign Application Priority Data

Mar. 30, 2018 (JP) .................................. 2018-067834

(51) Int. Cl.
| | |
|---|---|
| *F16F 3/093* | (2006.01) |
| *B29C 70/68* | (2006.01) |
| *B29C 65/48* | (2006.01) |
| *B29C 65/56* | (2006.01) |
| *B29L 31/00* | (2006.01) |

(52) U.S. Cl.
CPC ............ *F16F 3/0935* (2013.01); *B29C 65/48* (2013.01); *B29C 65/565* (2013.01); *B29C 70/68* (2013.01); *B29K 2995/0046* (2013.01); *B29L 2031/721* (2013.01); *F16F 2224/025* (2013.01); *F16F 2224/0208* (2013.01); *F16F 2226/04* (2013.01); *F16F 2226/042* (2013.01); *F16F 2226/045* (2013.01); *F16F 2234/02* (2013.01)

(58) Field of Classification Search
CPC ................ F16F 3/0935; F16F 2226/04; F16F 2226/042; F16F 2224/025; F16F 2224/0208; F16F 2234/02; F16F 2226/045; F16F 1/3842; F16F 1/3835; B29C 70/68; B29C 65/48; B29C 65/565; B29L 2031/721; B29K 2995/0046
USPC .......................................................... 156/242
See application file for complete search history.

(56) References Cited

U.S. PATENT DOCUMENTS 2,048,256 A * 7/1936 Geyer .................... F16F 1/3835
 403/228
2,327,113 A * 8/1943 Krotz ............................ 267/281
(Continued)

FOREIGN PATENT DOCUMENTS

| | | | |
|---|---|---|---|
| GB | 2343731 B | * | 9/2000 |
| JP | 2009-097686 A | | 5/2009 |

(Continued)

*Primary Examiner* — Michael N Orlando
*Assistant Examiner* — Abhishek A Patwardhan
(74) *Attorney, Agent, or Firm* — Maschoff Brennan (57) ABSTRACT

A method for manufacturing a vibration isolation apparatus includes: molding elastic parts of an elastic body; compressing in which the elastic parts are pressed against positions in which the elastic parts are provided to an inner member so that the elastic parts are compressed to have a size equivalent to a size in which the elastic parts fit between the inner member and an outer cylinder; press-fitting the inner member and the elastic parts integrally into the outer cylinder while the elastic parts are kept compressed; and fastening the elastic parts to the inner member and the outer cylinder.

4 Claims, 8 Drawing Sheets

(56) References Cited

U.S. PATENT DOCUMENTS

| | | | | |
|---|---|---|---|---|
| 3,071,850 A * | 1/1963 | Haushalter | ............ | F16F 15/124 29/450 |
| 3,071,851 A * | 1/1963 | Haushalter | ................ | F16D 3/76 29/451 |
| 3,754,317 A * | 8/1973 | Taylor | ..................... | B25B 27/28 29/451 |
| 5,887,859 A * | 3/1999 | Hadano | ..................... | F16F 1/38 267/141.1 |
| 6,837,345 B1 * | 1/2005 | Lauble | .................... | F16F 1/371 188/378 |
| 8,511,656 B2 * | 8/2013 | Yahata | .................. | F16F 1/3863 267/141.4 |
| 9,327,482 B2 * | 5/2016 | Feng | ........................ | C08J 5/124 |

FOREIGN PATENT DOCUMENTS

| | | |
|---|---|---|
| JP | 2011-007257 A | 1/2011 |
| WO | WO-02050450 A1 * | 6/2002 |

\* cited by examiner

METHOD FOR MANUFACTURING VIBRATION ISOLATION APPARATUS

CROSS-REFERENCE TO RELATED APPLICATION

This application claims priority to Japanese Patent Application No. 2018-067834 filed on Mar. 30, 2018, the entire disclosure of which is incorporated by reference herein.

BACKGROUND

The present disclosure relates to a method for manufacturing a vibration isolation apparatus.

A vibration isolation apparatus typically known in the art includes an inner cylinder and an outer cylinder coaxially connected via a cylindrical elastic body. Examples of a vibration isolation apparatus having such a configuration includes a vibration isolation mount cited in Japanese Patent No. 5052285 and a vibration isolation bushing cited in Japanese Unexamined Patent Publication No. 2011-7257.

The vibration isolation mount cited in Japanese Patent No. 5052285 is manufactured as follows: a rubber material is injected between an inner cylinder (an inner member) and an outer cylinder both set to a mold, and the inner cylinder, the outer cylinder, and the rubber material (a rubber elastic material) are integrally formed into one piece as the vibration isolation mount (insert molding).

Moreover, the vibration isolation bushing cited in Japanese Unexamined Patent Publication No. 2011-7257 includes an inner cylinder (an inner member), an outer cylinder, and a rubber elastic material provided between the inner cylinder and the outer cylinder. The rubber elastic material is provided with an axial drilling. In this axial drilling of the rubber elastic body, polyurethane foam is form-molded so that the polyurethane foam and the rubber elastic body adhere to each other into one piece. Moreover, the vibration isolation bushing cited in Japanese Unexamined Patent Publication No. 2011-7257 has the outer cylinder narrowed in order to enhance durability of the rubber elastic body and the polyurethane foam.

SUMMARY

Through compression, such characteristics as hardness, spring constant, and durability of the elastic body can be set. For a method for manufacturing a vibration isolation apparatus, it is desirable that a compression degree of the elastic body should be freely determined.

However, in each of the vibration isolation apparatuses disclosed in Japanese Patent No. 5052285 and Japanese Unexamined Patent Publication No. 2011-7257, the elastic body is integrally formed with the inner cylinder and the outer cylinder. Hence in order to compress the elastic body, the elastic body has to be reduced in diameter and narrowed together with the outer cylinder. Since a narrowing degree of the outer cylinder cannot be set so flexibly, the compression degree of the elastic body cannot also be determined flexibly, either.

The present disclosure intends to increase flexibility for setting a compression degree of an elastic body provided between an inner member and an outer cylinder.

The present disclosure relates to a method for manufacturing vibration isolation apparatus. The apparatus includes: an inner member shaped into a cylinder or a shaft; an outer cylinder provided around the inner member; and an elastic body provided between, and connecting, the inner member and the outer cylinder. The elastic body includes elastic parts each arranged in a different position between the inner member and the outer cylinder. The method includes: molding the elastic parts; compressing in which the elastic parts are pressed against positions in which the elastic parts are provided to the inner member so that the elastic parts are compressed to have a size equivalent to a size in which the elastic parts fit between the inner member and the outer cylinder; press-fitting the inner member and the elastic parts integrally into the outer cylinder while the elastic parts are kept compressed; and fastening the elastic parts to the inner member and the outer cylinder.

The present disclosure can increase flexibility for setting a compression degree of an elastic body.

DETAILED DESCRIPTION

Embodiments of the present disclosure will be described in detail below, with reference to the drawings. The following description of the advantageous embodiments is only an example in nature, and is not intended to limit the scope, applications or use of the present disclosure.

Embodiment 1

(Configuration of Vibration Isolation Apparatus)

A vibration isolation apparatus 1 according to this embodiment is a vibration isolation bushing to be used for, for example, a rear suspension of an automobile.

Figure 1:
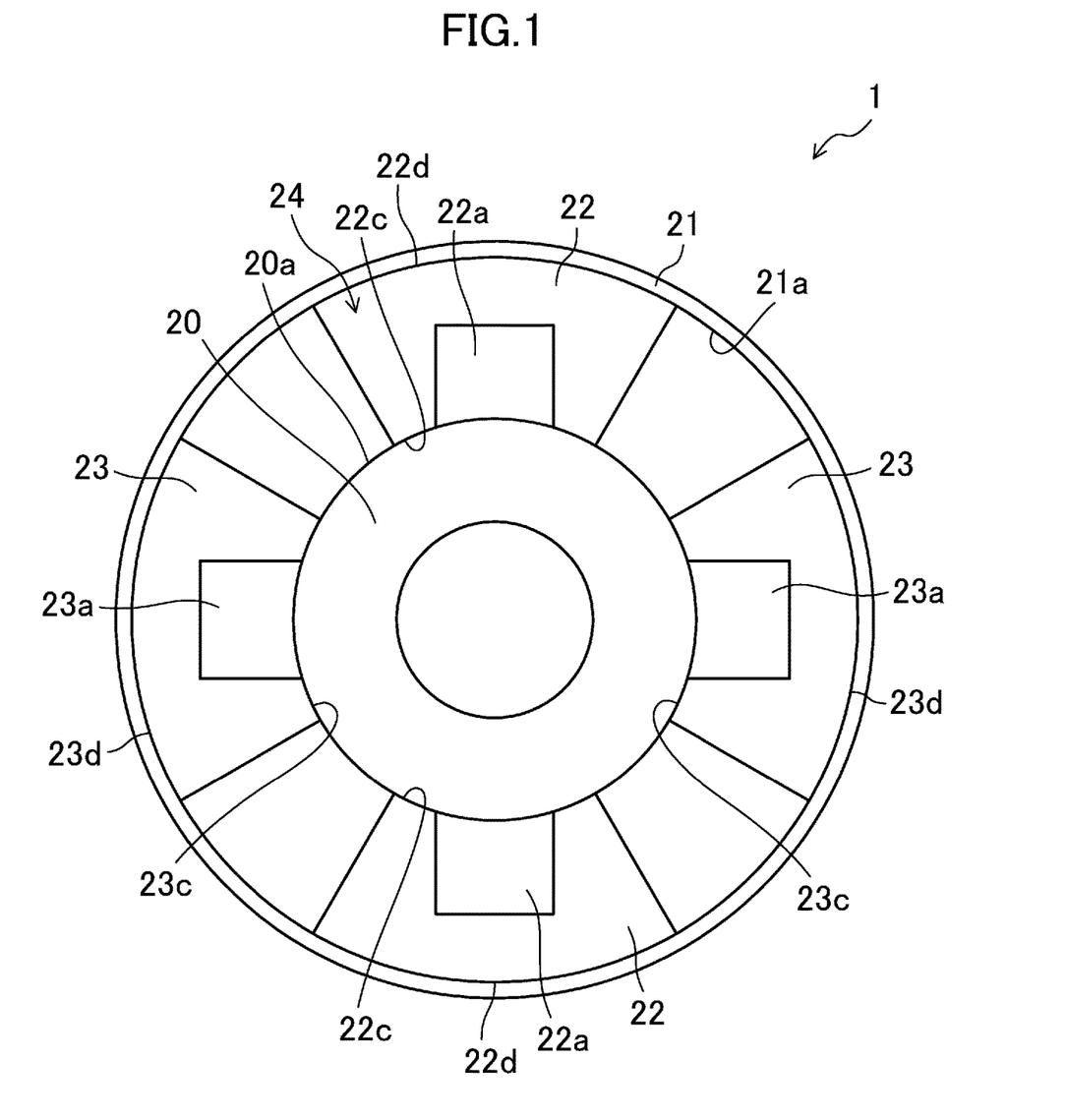
FIG. 1 is a front view of a vibration isolation apparatus according to an embodiment of the present disclosure.

As illustrated in FIG. 1, the vibration isolation apparatus 1 includes: an inner cylinder (an inner member) 20 made of metal; an outer cylinder 21 made of metal and coaxially provided to an outer periphery of the inner cylinder 20; and an elastic body 24 provided between the inner cylinder 20 and the outer cylinder 21 via a thermosetting adhesive and connects the inner cylinder 20 and the outer cylinder 21 to each other.

The inner cylinder 20 is fastened to a member toward an automotive body with, for example, a bolt to be inserted in the inner cylinder 20. Whereas, the outer cylinder 21 is press-fit into a press-fit hole formed on a trailing arm. The inner cylinder 20 has ends provided along an axis of the inner cylinder 20. The ends of the inner cylinder 20 protrude beyond ends, of the outer cylinder 21, provided along an axis of the outer cylinder 21. Note that the surfaces of the inner cylinder 20 and the outer cylinder 21 are treated with phosphate and covered with phosphate film so that the surfaces are kept from rust and corrosion.

The elastic body 24 includes: a pair of first elastic parts 22; and a pair of second elastic parts 23. Each of the first elastic parts 22 has a substantially sectoral cross-section, and extends along the cylindrical axis. The first elastic part 22 has an inner side face 22c formed to have an arc-shaped cross-section along with an outer periphery face 20a of the inner cylinder 20, so that the inner side face 22c comes into contact with the outer periphery face 20a. The first elastic part 22 has an outer side face 22d formed to have an arc-shaped cross-section along with an inner periphery face 21a of the outer cylinder 21, so that the outer side face 22d comes into contact with the inner periphery face 21a. The first elastic parts 22 are arranged across the inner cylinder 20 to face each other along the cylinder diameter.

The first elastic part 22 has opposite end faces along the cylindrical axis. Each of the end faces is integrally provided with a projection 22a protruding outward along the cylindrical axis and shaped into a substantial cuboid. The projections 22a are used to position the first elastic parts 22 in relation to an assembly jig 3 to be described later. The entire length of the first elastic part 22 along the cylindrical axis, including the length of the projection 22a along the cylindrical axis, is substantially the same as the length of the outer cylinder 21 along the cylindrical axis.

Each of the second elastic parts 23 is substantially the same in shape as the first elastic parts 22. The second elastic parts 23 are arranged across the inner cylinder 20 to face each other perpendicular to the direction in which the first elastic parts 22 face each other. Specifically, each of the first elastic parts 22 and the second elastic parts 23 is provided in a different position between the inner cylinder 20 and the outer cylinder 21.

The first elastic part 22 and the second elastic part 23 are each made of a rubber material with different characteristics such as hardness. For example, the first elastic parts 22 are made of a single raw material such as natural rubber. Whereas, the second elastic parts 23 are made of a composite material in which synthetic rubber such as styrene-butadiene rubber (SBR) is blended with natural rubber. Thus, the first elastic parts 22 have low dynamic magnification as a spring characteristic. Whereas the second elastic parts 23 have high damping property. As a result, the vibration isolation apparatus 1 has the low dynamic magnification in a direction across the first elastic parts 22, and the high damping property in a direction across the second elastic parts 23.

(Configuration of Assembly Jig)

Described below is the assembly jig 3 for manufacturing the above vibration isolation apparatus 1.

Figure 2:
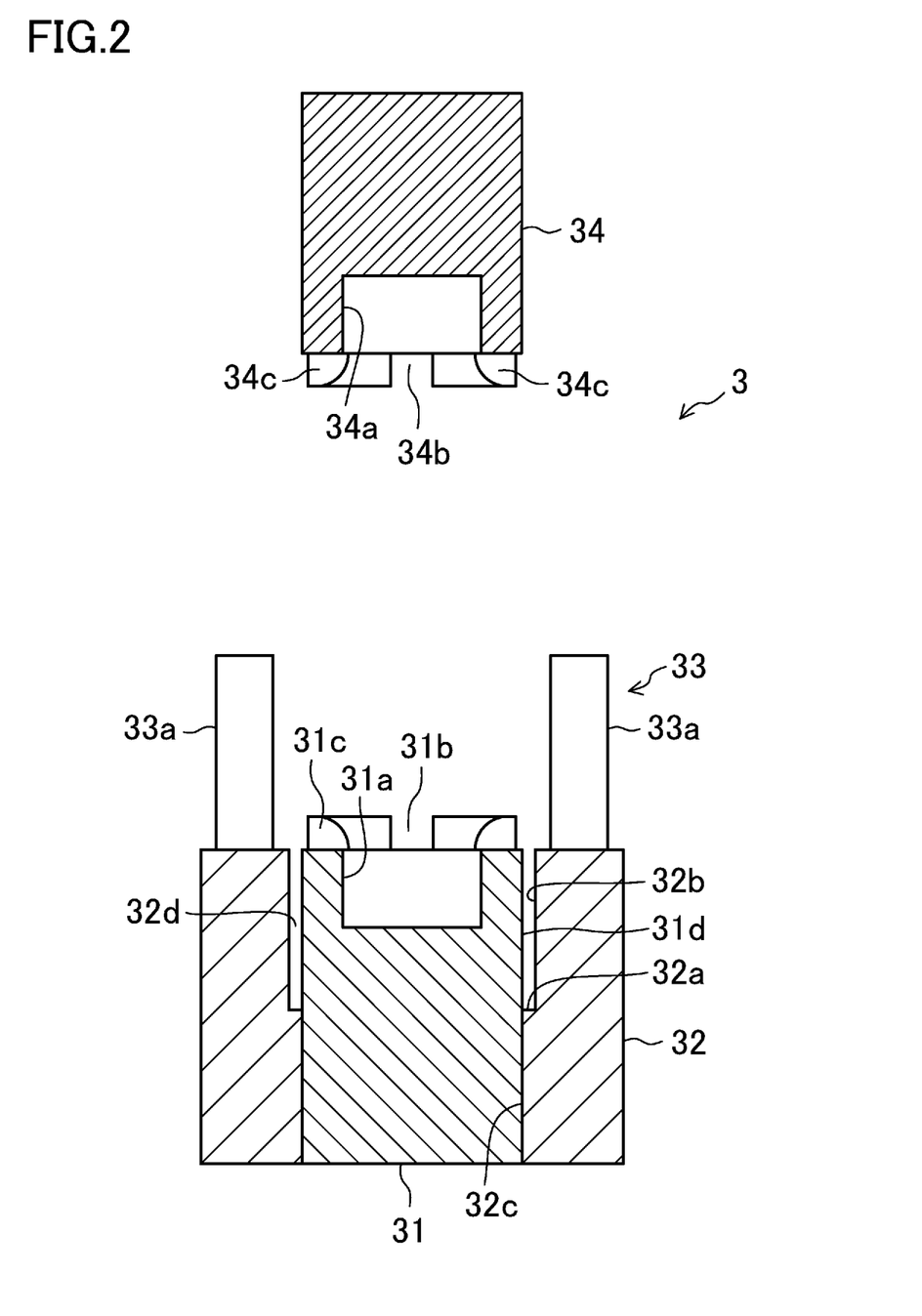
FIG. 2 is a cross-sectional view of an assembly jig, according to Embodiment 1, before members of the vibration isolation apparatus are provided to the assembly jig.

As illustrated in FIG. 2, the assembly jig 3 is made of metal, and includes: a receiving jig 31; a support jig 32; a narrowing jig 33; and a pressing jig 34.

The receiving jig 31 is used for positioning the inner cylinder 20, the first elastic parts 22, and the second elastic parts 23, and coaxially arranging the outer cylinder 21 and the inner cylinder 20. The receiving jig 31 is shaped into a substantial column. The receiving jig 31 has a top end face provided with a recess 31a shaped into a circle, so that a bottom end of the inner cylinder 20 is fit into and received with the recess 31a. The opening diameter of this recess 31a is slightly larger than the outer diameter of the inner cylinder 20. The depth of the recess 31a is substantially the same as the length of a portion of an axial one end (the bottom end in, for example, FIG. 3) of the inner cylinder 20, the portion protruding from the outer cylinder 21.

The top end face of the receiving jig 31 has positioning guides 31c for guiding the projections 22a and 23a provided on one side (a lower side, for example, in FIG. 3) of the elastic parts 22 and 23 along the cylindrical axis. There are four such positioning guides 31c spaced apart from each other between equally spaced intervals (grooves) 31b, and equally formed along the circumference of the receiving jig 31.

The grooves 31b are formed to receive the projections 22a and 23a of the elastic parts 22 and 23. There are four such grooves 31b equally spaced apart from each other along the circumference of the receiving jig 31. The width (the length along the cylinder circumference) of each groove 31b is substantially the same as the width of each of the projections 22a and 23a of the elastic parts 22 and 23. The depth of each groove 31b is shorter than the height of the projections 22a and 23a of the elastic parts 22 and 23. The length of each groove 34b along the cylinder diameter is greater than the length of the projections 22a and 23a along the cylinder diameter.

The receiving jig 31 is used for press-fitting the inner cylinder 20, the first elastic parts 22, and the second elastic parts 23 into the outer cylinder 21 provided coaxially with the inner cylinder 20. The receiving jig 31 is vertically movable in order to press-fit the inner cylinder 20 and the elastic parts 22 and 23 into the outer cylinder 21. Note that, in FIG. 2, the receiving jig 31 is positioned at the top end of the range of motion.

The support jig 32 is used for supporting the outer cylinder 21 from below and the side. The support jig 32 is shaped into a substantial cylinder having a thick wall. The length of the support jig 32 in a vertical direction (along the cylindrical axis) is substantially the same as the vertical length of the receiving jig 31 except the positioning guide 31c. The outer diameter of the support jig 32 is constant.

The inner diameter of the support jig 32 varies between an upper portion and a lower portion of the support jig 32. Specifically, a circular step 32a is formed on an axial center portion on the inner periphery face of the support jig 32. A portion (hereinafter referred to as an upper inner periphery face 32b), above the step 32a, of the inner periphery face of the support jig 32 has an inner diameter slightly larger than the outer diameter of the outer cylinder 21. A portion (hereinafter referred to as a lower inner periphery face 32c), below the step 32a, of the inner periphery face of the support jig 32 has an inner diameter slightly larger than the outer diameter of the receiving jig 31. Specifically the inner diameter of the upper inner periphery face 32b of the support jig 32 is larger than the inner diameter of the lower inner periphery face 32c by the thickness of the outer cylinder 21.

When the receiving jig 31 is positioned at the top end of the range of motion, the support jig 32 defines a receiving portion 32d with the upper inner periphery face 32b, the step 32a, and the outer periphery face 31d of the receiving jig 31 so that the outer cylinder 21 can be fit and received into the receiving portion 32d. The support jig 32 is fixed not to move vertically.

Provided to an upper portion of the support jig 32, the narrowing jig 33 is used for pressing against the inner cylinder 20 the elastic parts 22 and 23 positioned with the receiving jig 31. The narrowing jig 33 is a cylindrical member equally divided into four with planes including the axis of the cylindrical member. Specifically, the narrowing jig 33 includes four jig pieces 33a having a substantially sectoral cross-section and arranged radially. In whole, the narrowing jig 33 is substantially shaped into a cylinder.

The narrowing jig 33 can be changed in a closed state in which the narrowing jig 33 is shaped into a substantial cylinder as described above, and an open state in which the jig pieces 33a make a positional change outwards along the diameter of the narrowing jig 33. Specifically, the jig pieces 33a of the narrowing jig 33 in the closed state are tightly arranged. The neighboring jig pieces 33a of the narrowing jig 33 in the open state are spaced apart from each other.

An inner side face of each of the jig pieces 33a is a curved surface corresponding to a curvature of the outer periphery face of the outer cylinder 21. The axial length of the jig piece 33a is slightly longer than the total length of the elastic parts 22 and 23 and the projections 22a and 23a along the cylindrical axis. The narrowing jig 33 in the closed state defines a space the cross-section of which is circular, because the inner side faces of the jig pieces 33a join with each other.

The pressing jig 34 is used for pressing downward the inner cylinder 20 and the elastic parts 22 and 23 integrated in one piece by the narrowing jig 33, and press-fitting the integrated inner cylinder 20 and the elastic parts 22 and 23 into the outer cylinder 21. The pressing jig 34 is shaped into a substantial column. The pressing jig 34 has a bottom end face provided with a recess 34a shaped into a circle, so that a top end of the inner cylinder 20 is fit into and received with the recess 34a. The opening diameter of this recess 34a is slightly larger than the outer diameter of the inner cylinder 20. The depth of the recess 34a is substantially the same as the length of a portion of an axial another end (the top end in, for example, FIG. 3) of the inner cylinder 20, the portion protruding from the outer cylinder 21.

The bottom end face of the pressing jig 34 has positioning guides 34c for guiding the projections 22a and 23a provided on another side (an upper side, for example, in FIG. 3) of the elastic parts 22 and 23 along the cylindrical axis. There are four such positioning guides 34c spaced apart from each other between equally spaced intervals (grooves) 34b, and equally formed along the circumference of the pressing jig 34.

Figure 3:
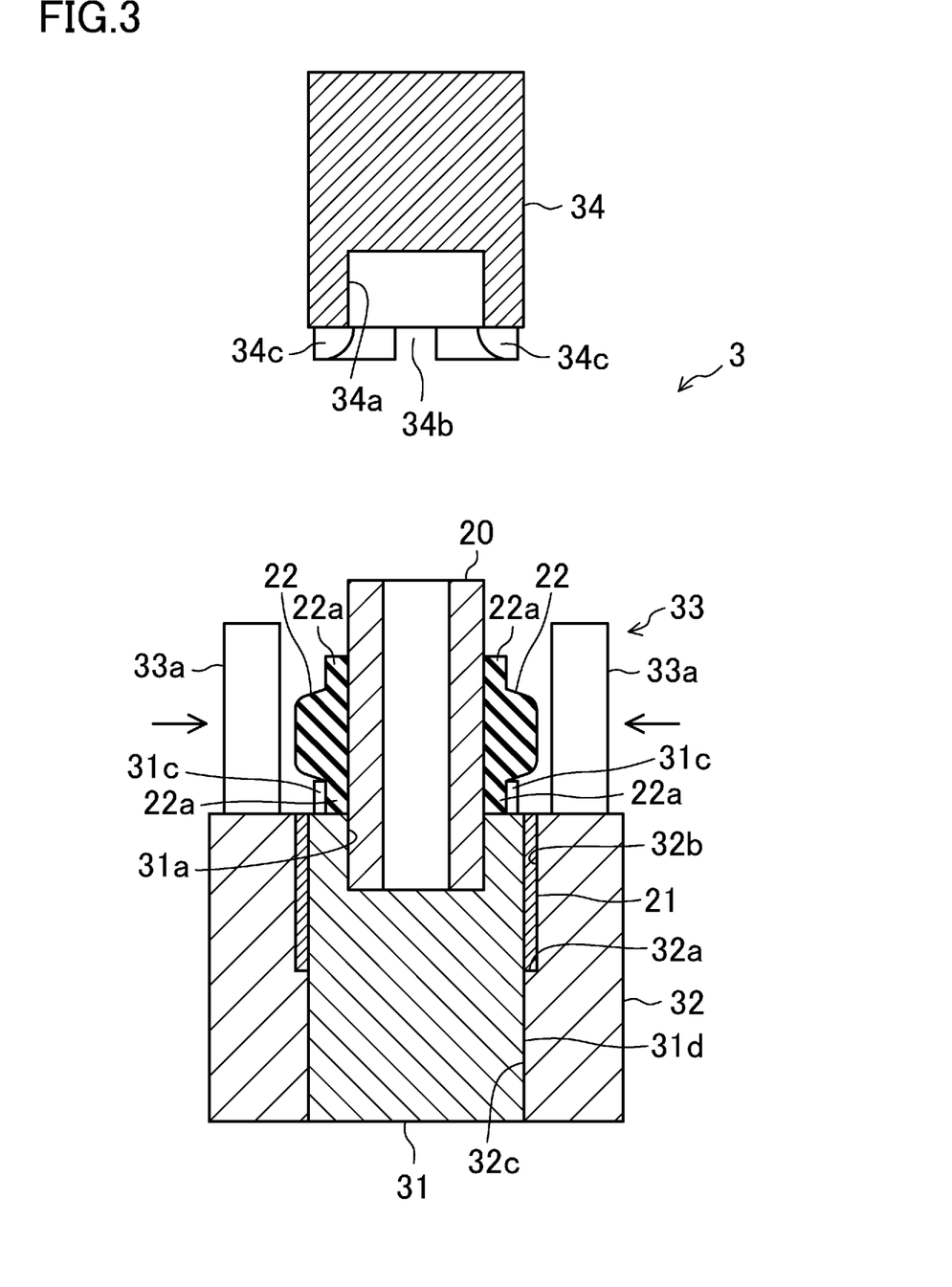
FIG. 3 is a cross-sectional view of the assembly jig, according to Embodiment 1, after members of the vibration isolation apparatus are provided to the assembly jig.

The grooves 34b are formed to receive the projections 22a and 23a of the elastic parts 22 and 23. There are four such grooves 34b equally spaced apart from each other along the circumference of the pressing jig 34. The width (the length along the cylinder circumference) of the grooves 34b is substantially the same as the width of the projections 22a and 23a of the elastic parts 22 and 23. The depth of the grooves 34b is shorter than the height of the projections 22a and 23a of the elastic parts 22 and 23. The length of each groove 34b along the cylinder diameter is greater than the length of the projections 22a and 23a along the cylinder diameter.

The pressing jig 34 is used for press-fitting the inner cylinder 20 and the first elastic parts 22 and the second elastic parts 23 into the outer cylinder 21 provided coaxially with the inner cylinder 20. The pressing jig 34 is vertically movable in order to press-fit the inner cylinder 20 and the elastic parts 22 and 23 into the outer cylinder 21. Note that, in FIG. 2, the pressing jig 34 is positioned at the top end of the range of motion.

When positioned at the bottom end of the range of motion, the pressing jig 34 is spaced apart from the receiving jig 31 so that the distance between the upper bottom face of the recess 34a of the pressing jig 34 and the lower bottom face of the recess 31a of the receiving jig 31 is substantially the same as the length of the inner cylinder 20 along the cylindrical axis.

(Method for Manufacturing Vibration Isolation Bushing)

Described below is a method for manufacturing the vibration isolation apparatus 1 using the above assembly jig 3.

First, using a mold (not shown) for each of the elastic parts 22 and 23, the first elastic parts 22 and the second elastic parts 23 are separately vulcanized and molded (a molding step).

Next, a thermosetting adhesive is applied throughout the inner side faces 22c, 23c and the outer side faces 22d, 23d of the elastic parts 22, 23 (fastening surfaces (adhesive surfaces) (i) between the inner cylinder 20 and the elastic parts 22, 23, and (ii) between the outer cylinder 21 and the elastic parts 22, 23). The applied thermosetting adhesive is dried (an applying step; i.e., a part of a fastening step). The adhesive applied throughout the inner side faces 22c and 23c and the outer side faces 22d and 23d of the elastic parts 22 and 23 is less likely to create an un-bonded area between (i) the elastic parts 22 and 23 and the inner cylinder 20 and (ii) the elastic parts 22 and 23 and the outer cylinder 21.

Moreover, a press-fitting aid such as oil is applied to the outer side faces 22d and 23d of the elastic parts 22 and 23. In a press-fitting step to be described later, the applied press-fitting aid allows the inner cylinder 20 and the elastic parts 22 and 23 to be smoothly press-fit into the outer cylinder 21.

Next, as illustrated in FIG. 2, the receiving jig 31 of the assembly jig 3 is positioned to the top end of the range of motion, and the narrowing jig 33 is opened. Then, the pressing jig 34 is moved to the top end of the range of motion. In this state, as illustrated in FIG. 3, the receiving portion 32d of the support jig 32 receives the outer cylinder 21, and the recess 31a of the receiving jig 31 receives the inner cylinder 20. Each of the grooves 31b receives a corresponding one of the projections 22a and 23a provided in a lower part of the elastic parts 22 and 23.

Figure 4:
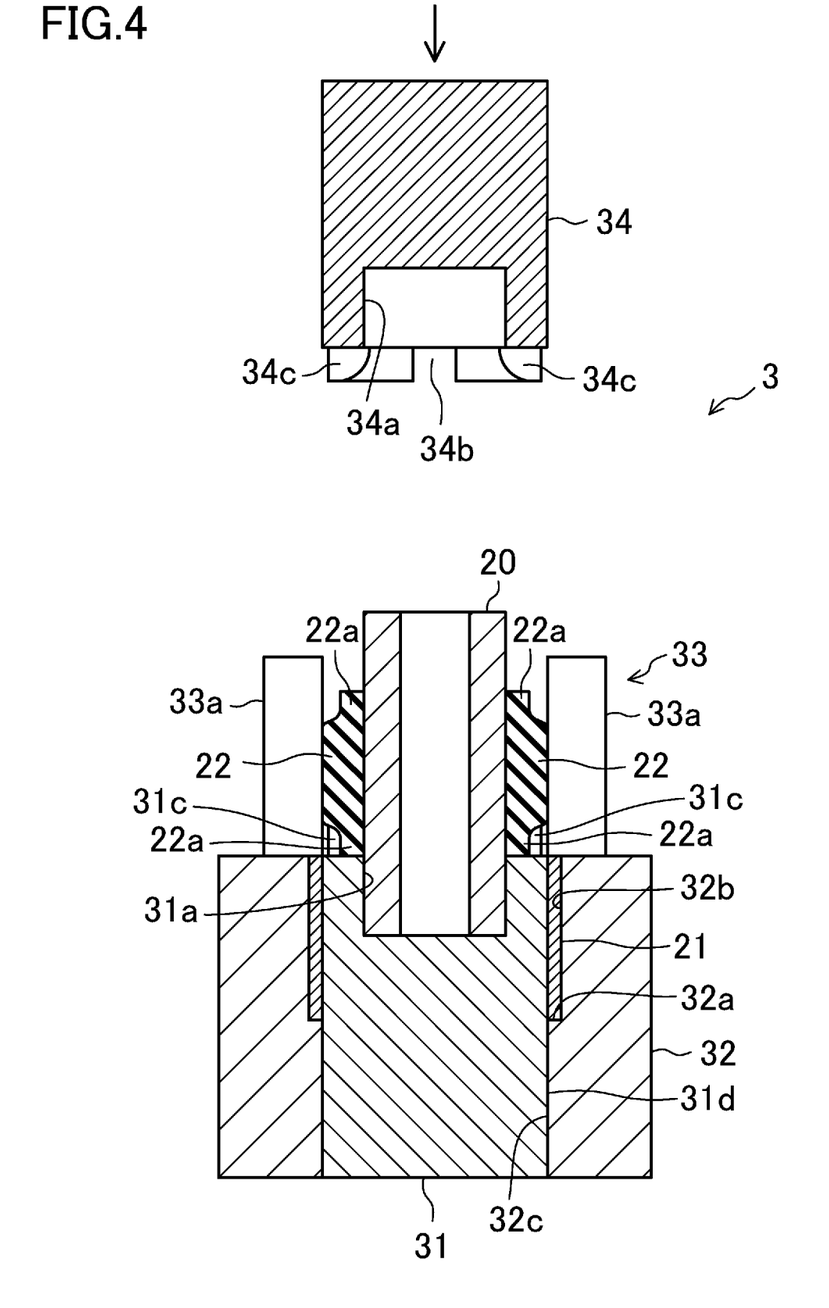
FIG. 4 is a cross-sectional view of the assembly jig, according to Embodiment 1, with a receiving jig moved.

Next, the narrowing jig 33 is pressed inward by a narrowing-jig-positional-change apparatus (not shown) along the diameter. (See the straight arrow in FIG. 3.) When the narrowing jig 33 is pressed, the spaces between the neighboring jig pieces 33a in the narrowing jig 33 narrow. Then, the opened support jig 32 is closed. Thus, as illustrated in FIG. 4, the elastic parts 22 and 23 are pressed against positions in which the elastic parts 22 and 23 are provided to the inner cylinder 20. The elastic parts 22 and 23 are compressed to have a size equivalent to a size in which the elastic parts 22 and 23 fit between the inner cylinder 20 and the outer cylinder 21 (when the vibration isolation apparatus 1 is completed). In other words, elastic parts 22 and 23 are compressed in size to fit between the inner cylinder 20 and the outer cylinder 21 (a compressing step). When pressed into this size, the elastic parts 22 and 23, as well as the inner cylinder 20, can be press-fit into the outer cylinder 21 in the press-fitting step.

Figure 5:
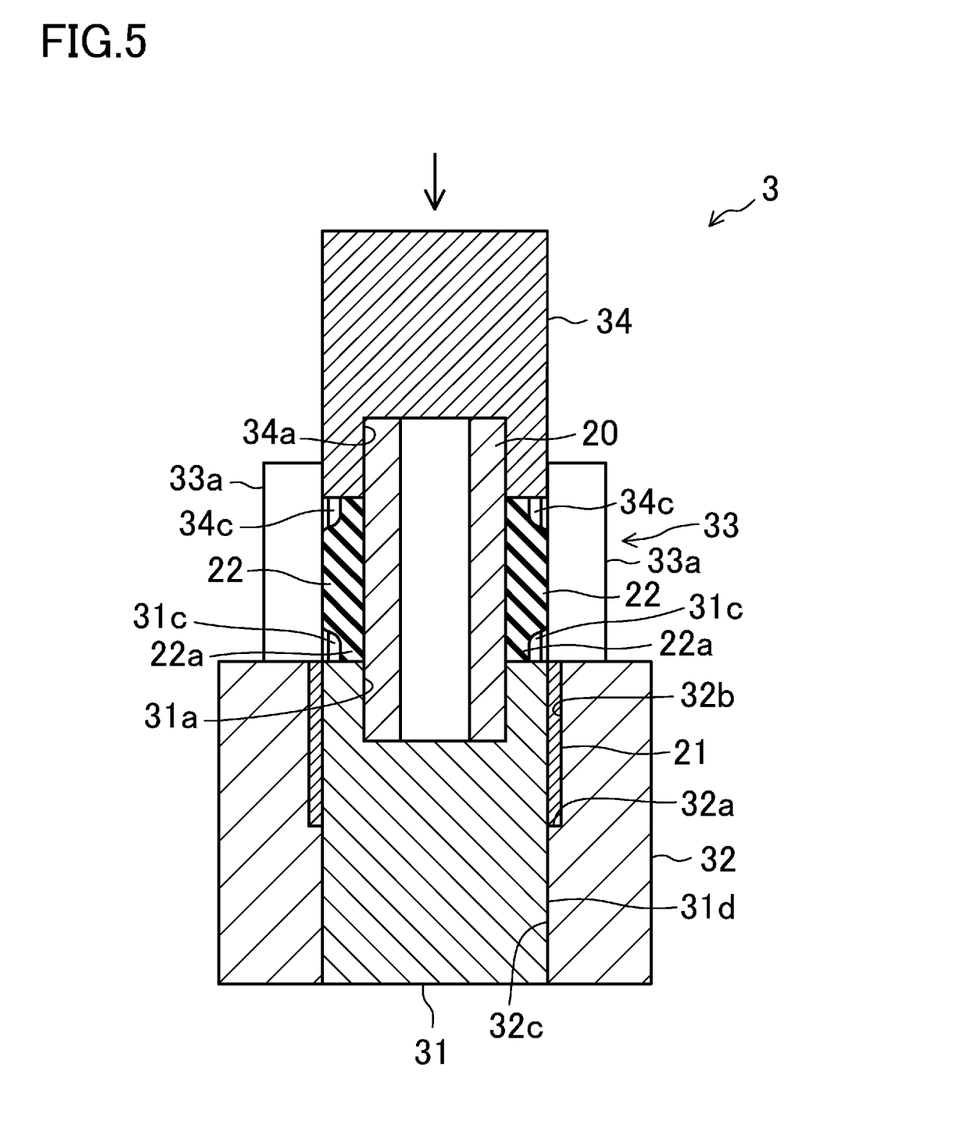
FIG. 5 is a cross-sectional view of the assembly jig, according to Embodiment 1, with a narrowing jig closed.

Next, the pressing jig 34 is moved downward. (See the straight arrow in FIG. 4.) Then, as illustrated in FIG. 5, the recess 34a of the pressing jig 34 receives an upper portion of the inner cylinder 20, and each of the grooves 34b of the pressing jig 34 receives a corresponding one of the projections 22a and 23a provided in an upper part of the elastic parts 22 and 23.

Figure 6:
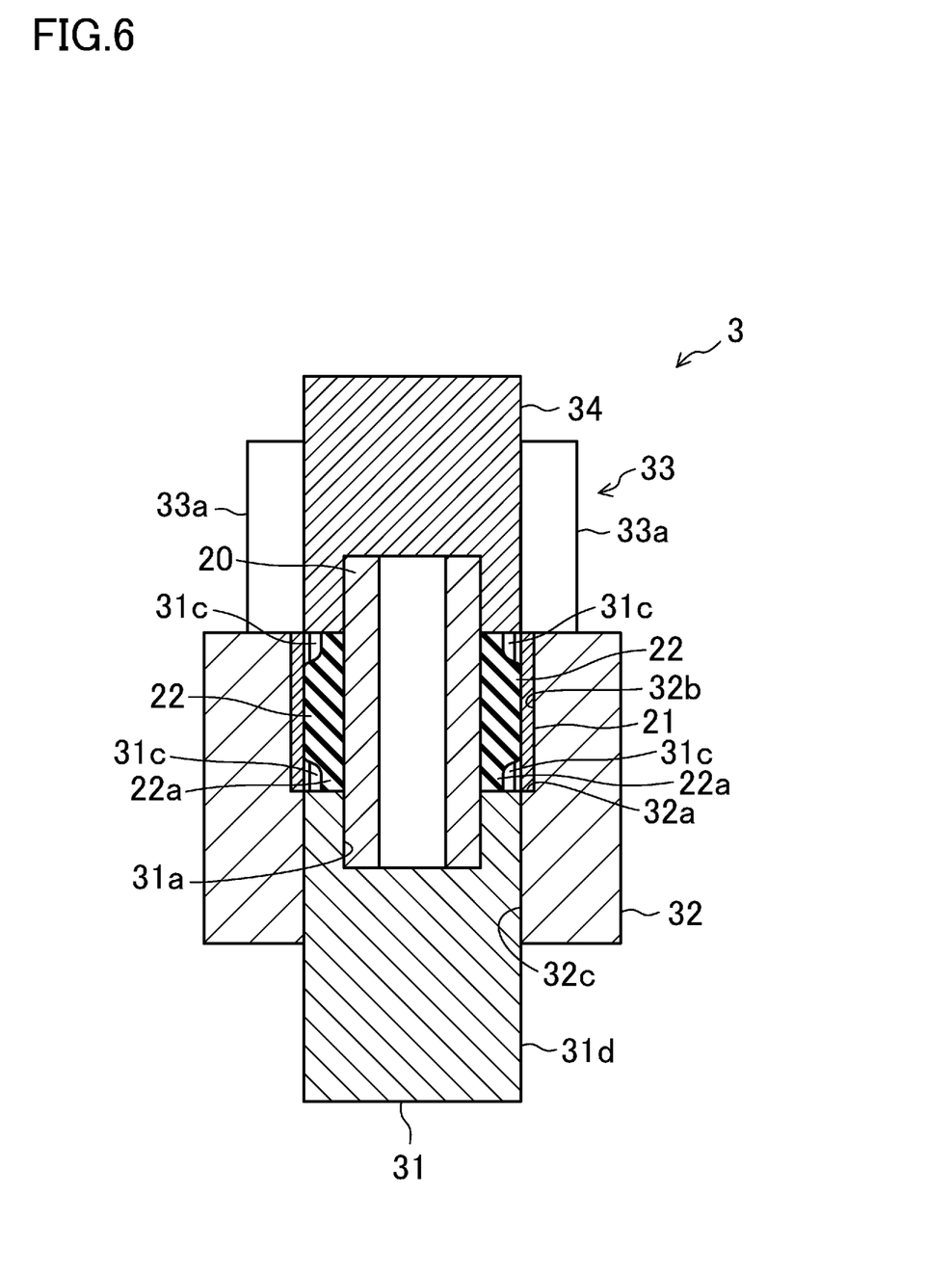
FIG. 6 is a cross-sectional view of the assembly jig, according to Embodiment 1, with a pressing jig moved.

When the pressing jig 34 is moved further downward (see the straight arrow in FIG. 5), the elastic parts 22 and 23 are kept compressed in the compressing step, and the inner cylinder 20 and the elastic parts 22 and 23 integrated into one piece are pressed and moved downward together with the receiving jig 31. As a result, as illustrated in FIG. 6, the elastic parts 22 and 23 are kept compressed, and the inner cylinder 20 and the elastic parts 22 and 23 are integrally press-fit into the outer cylinder 21 received in the receiving portion 32d (the press-fitting step).

Next, the narrowing jig 33 is opened, the pressing jig 34 is moved upward, and the assembled vibration isolation apparatus 1 is taken from the assembly jig 3.

Next, the outer cylinder 21 is narrowed inward by an outer cylinder narrowing jig (not shown) along the diameter, such that the elastic parts 22 and 23 are further additionally compressed (an outer cylinder narrowing step).

After that, the vibration isolation apparatus 1 is placed in a curing oven (not shown) so that the dried thermosetting adhesive applied to the inner side faces 22c, 23c and the outer side faces 22d, 23d of the elastic parts 22, 23 is cured. Thus, the elastic parts 22 and 23 are bonded with and fastened to the inner cylinder 20 and the outer cylinder 21 (a curing step (i.e., a part of the fastening step)). Hence, the vibration isolation apparatus 1 is completed.

(Advantages)

Thus, in the compressing step of this embodiment, the elastic parts 22 and 23 molded in the molding step are pressed against positions in which the elastic parts 22 and 23 are provided to the inner cylinder 20, and the elastic parts 22 and 23 are compressed in size to fit between the inner cylinder 20 and the outer cylinder 21. Such features make it possible to directly compress the elastic body 24, contributing to an increase in flexibility for setting a compression degree of the elastic body 24.

Moreover, if the narrowing degree of an outer cylinder is increased such that the compression degree of an elastic part is increased when the elastic body is integrally molded together with the inner cylinder and the outer cylinder, an adhesive coat applied to an inner periphery face of the outer cylinder is broken such that the outer cylinder and the elastic parts could not sufficiently be bonded together. In addition, phosphate film covering the inner periphery face of the outer cylinder could be broken.

In this embodiment, the elastic parts 22 and 23 are mainly pressed against the inner cylinder 20 so that the elastic parts 22 and 23 are compressed. Such a feature makes it possible to increase the compression degree of the elastic body 24 without breaking thermosetting adhesive film and phosphate film.

When each of the first elastic parts 22 and the second elastic parts 23 are made of a different rubber material, insert molding by a multicolor molder could be employed to provide the first elastic parts 22 and the second elastic parts 23 between the inner cylinder 20 and outer cylinder 21. However, this insert molding poses such problems: rubber materials having significant variation in molding time and molding temperature cannot be used as those for the first elastic parts 22 and the second elastic parts 23, a large axial drilling is required to keep the rubber materials from mixing together, the multicolor molder is expensive, and a mold for insert molding is complex in structure.

In this embodiment, the first elastic parts 22 and the second elastic parts 23 are provided between the inner cylinder 20 and the outer cylinder 21 in the press-fitting step. Such a feature makes it possible to provide the first elastic parts 22 and the second elastic parts 23, each made of a different rubber material, between the inner cylinder 20 and the outer cylinder 21 without a problem caused by the insert molding using a multicolor molder.

Moreover, in order to bond the inner cylinder 20 and the outer cylinder 21 to the elastic parts 22 and 23, a liquid adhesive could be applied before the press-fitting step to the outer periphery face 20a of the inner cylinder 20 and the inner periphery face 21a of the outer cylinder 21. In this case, the adhesive could inevitably attach to a manufacturing jig of the vibration isolation apparatus 1.

In this embodiment, in the applying step before the press-fitting step, the thermosetting adhesive is applied to the outer periphery face 20a of the inner cylinder 20 and the inner periphery face 21a of the outer cylinder 21, and the thermosetting adhesive is dried. The thermosetting adhesive is cured in the curing step after the press-fitting step, so that the elastic parts 22 and 23 can be bonded with and fastened to the inner cylinder 20 and the outer cylinder 21, reducing the risk of the thermosetting adhesive attaching to the manufacturing jig of the vibration isolation apparatus 1.

Embodiment 2

Figure 7:
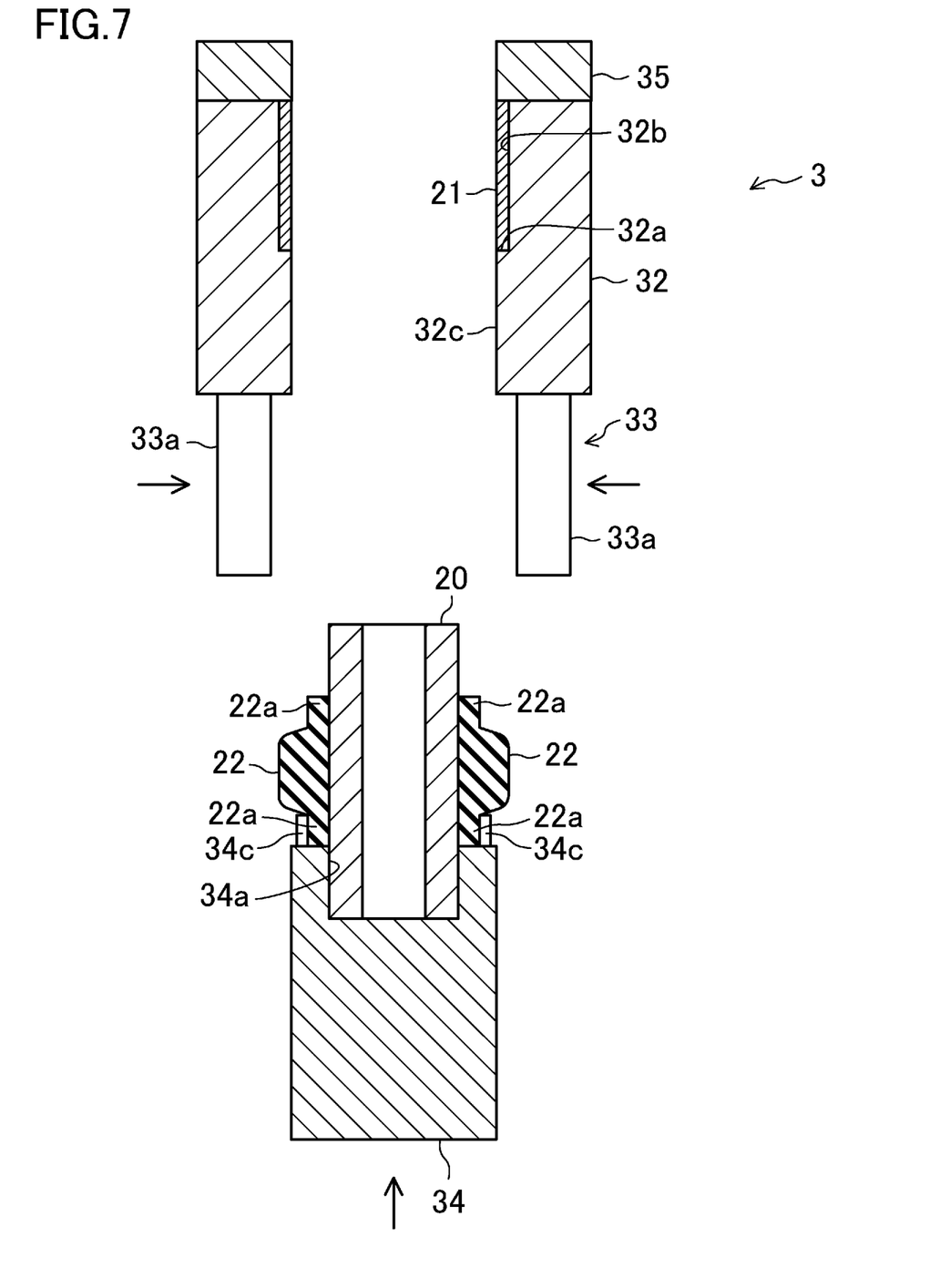
FIG. 7 is a cross-sectional view of an assembly jig, according to Embodiment 2, after members of the vibration isolation apparatus are provided to the assembly jig.
Figure 8:
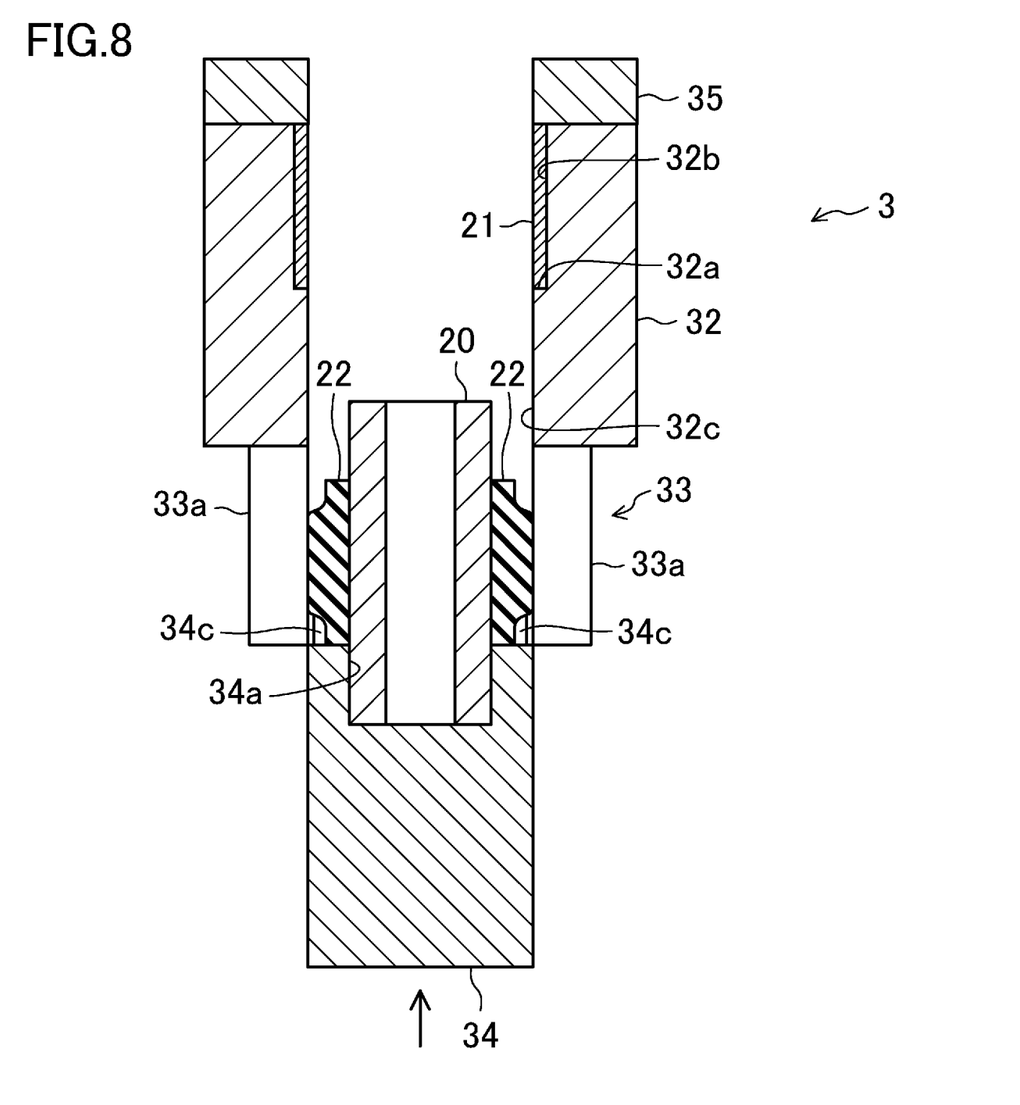
FIG. 8 is a cross-sectional view of the assembly jig, according to Embodiment 2, with a narrowing jig closed.

FIGS. 7 and 8 show Embodiment 2 of the present disclosure, illustrating a change in the configuration of the assembly jig 3. In FIGS. 7 and 8, like reference characters as illustrated in FIGS. 1 to 6 designate identical or corresponding components, and the detailed explanation thereof will be omitted.

As illustrated in FIG. 7, Embodiment 2 is different from Embodiment 1 as follows: No receiving jig 31 is used. The pressing jig 34 is provided in a manner that the recess 34a of the pressing jig 34 is opened upward. The recess 34a receives the inner cylinder 20. The grooves 34b of the receiving jig 34 receive a corresponding one of the elastic parts 22 and 23. Note that, in FIG. 7, the pressing jig 34 is positioned at the bottom end of the range of motion thereof.

The support jig 32 is provided above the pressing jig 34. The narrowing jig 33 is provided below the support jig 32. When the pressing jig 34 is at the bottom of the range of motion, the narrowing jig 33 is provided above the pressing jig 34. On a top face of the support jig 32, a plug 35 is removably provided. The plug 35 is used to keep the outer cylinder 21 from slipping out of an upper portion of the support jig 32 when the outer cylinder 21 is received in the receiving portion 32d. The other features and advantages are the same as those of the Embodiment 1.

In this embodiment, the pressing jig 34 provided with the inner cylinder 20 and the elastic parts 22 and 23 is moved upward so that the inner cylinder 20 and the elastic parts 22 and 23 are moved inside the narrowing jig 33. Then, the narrowing jig 33 is pressed inward by a narrowing-jig-positional-change apparatus along the diameter. When the narrowing jig 33 is pressed, the spaces between the neighboring jig pieces 33a in the narrowing jig 33 narrow. Then, the opened support jig 32 is closed. This is how the compressing step is carried out.

When the pressing jig 34 is moved upward, the elastic parts 22 and 23 are kept compressed in the compressing step, and the inner cylinder 20 and the elastic parts 22 and 23 integrated into one piece are pressed and moved upward (see the straight arrow in FIG. 8). This is how the press-fitting step is carried out.

In such a manner, the vibration isolation apparatus 1 is assembled with the assembly jig 3.

After that, the plug 35 is removed, and the assembled vibration isolation apparatus 1 is taken from the assembly jig 3.

Other steps than the above are the same as those in Embodiment 1.

According to this embodiment, the receiving jig 31 is not required, simplifying the configuration of the assembly jig 3.

Other Embodiments

In the above embodiments, the inner cylinder 20 is used as an inner member. Alternatively, a solid shaft may be used as the inner member.

In the above embodiments, the elastic parts 22 and 23 have a sectoral cross-section. Alternatively, for example, the elastic parts 22 and 23 may have a substantially quadrangular cross-section.

In the above embodiments, the second elastic parts 23 are the same in shape as the first elastic parts 22. Alternatively, the second elastic parts 23 may be different in shape from the first elastic parts 22.

In the above embodiments, the elastic parts 22 and 23 are made of a rubber material. Alternatively, the elastic parts 22 and 23 may be made of such materials as urethane, thermoplastic elastomer, and a viscoelastic material.

In the above embodiments, the first elastic parts 22 are different in contained rubber material from the second elastic parts 23. Alternatively, the first elastic parts 22 and the second elastic parts 23 may be made of the same rubber material.

In the above embodiments, the first elastic parts 22 are different in characteristics such as hardness from the second elastic parts 23. Alternatively, the first elastic parts 22 and the second elastic parts 23 may be the same in characteristics.

In the above embodiments, the elastic parts 22 and 23 are vulcanized and molded in the molding step. Alternatively, the elastic parts 22 and 23 may be produced in such a manner that a vulcanized block or stick is cut by such techniques as laser cutting and water-jet cutting.

In the above embodiments, the inner cylinder 20 and the elastic parts 22 and 23 are moved to be press-fit into the outer cylinder 21 in the press-fitting step. Alternatively, the outer cylinder 21 may be moved so that the inner cylinder 20 and the elastic parts 22 and 23 are press-fit into the outer cylinder 21.

In the applying step before the press-fitting step of the above embodiments, the thermosetting adhesive is applied to the outer periphery face 20a of the inner cylinder 20 and the inner periphery face 21a of the outer cylinder 21, and the thermosetting adhesive is dried. Then, in the curing step after the press-fitting step, the thermosetting adhesive is cured so that the elastic parts 22 and 23 are bonded with and fastened to the inner cylinder 20 and the outer cylinder 21. Alternatively, the compressing step and the press-fitting step may be carried out after the elastic parts 22 and 23 have been bonded with and fastened to the inner cylinder 20.

In the applying step of the above embodiments, the thermosetting adhesive is applied throughout the inner side faces 22c, 23c and the outer side faces 22d, 23d of the elastic parts 22, 23. Alternatively, the thermosetting adhesive may be applied to the positions in which the elastic parts 22 and 23 are provided to the outer periphery face 20a of the inner cylinder 20 and the inner periphery face 21a of the outer cylinder 21. The thermosetting adhesive may also be applied to both of the positions; namely, both (i) throughout the inner side faces 22c, 23c and the outer side faces 22d and 23d, and (ii) the positions of the elastic parts 22 and 23 on the outer periphery face 20a and the inner periphery face 21a.

In the fastening step of the above embodiments, the elastic parts 22 and 23 are bonded with and fastened to the inner cylinder 20 and the outer cylinder 21. Alternatively, only the inner cylinder 20 and the elastic parts 22 and 23 may be bonded with and fastened to each other, the outer cylinder 21 and the elastic parts 22 and 23 may be left unbonded, and the axially opposite ends of the outer cylinder 21 may be reduced in diameter, bent, bent with a curved portion, and chamfered and bent so that the positions of the elastic parts 22 and 23 are limited. Thus, the elastic parts 22 and 23 may be fastened together with the inner cylinder 20 and the outer cylinder 21.

In the fastening step of the above embodiments, the elastic parts 22 and 23 are bonded with and fastened to the inner cylinder 20 and the outer cylinder 21. Alternatively, the inner cylinder 20 and the outer cylinder 21 are left unbonded with the elastic parts 22 and 23, and the outer periphery face 20a of the inner cylinder 20 or the inner periphery face 21a of the outer cylinder 21 is provided with a positioning portion, such as a protrusion or a recess, for positioning the elastic parts 22 and 23. This positioning portion may fasten the elastic parts 22 and 23 to the inner cylinder 20 and the outer cylinder 21.

In the above embodiments, the press-fitting aid is applied to the outer side faces 22d and 23d of the elastic parts 22 and 23. Alternatively, the press-fitting aid does not have to be applied.

In the above embodiments, the outer cylinder narrowing step is carried out. Alternatively, the outer cylinder narrowing step does not have to be carried out.

The present disclosure is useful for, for example, manufacturing a vibration isolation apparatus.

What is claimed is:

1. A method for manufacturing a vibration isolation apparatus the vibration isolation apparatus including: an inner member shaped into a cylinder or a shaft; an outer cylinder provided around the inner member; and an elastic body provided between, and connecting, the inner member and the outer cylinder, the elastic body including elastic parts each arranged in different positions separated from each other in a circumferential direction between the inner member and the outer cylinder, the method comprising:
    molding the elastic parts separately;
    compressing the elastic parts in which the elastic parts are pressed against the positions such that the elastic parts are separated from each other in the circumferential direction and in which the elastic parts are provided to the inner member so that the elastic parts are compressed to have a size equivalent to a size in which the elastic parts fit between the inner member and the outer cylinder;
    press-fitting the inner member and the elastic parts integrally into the outer cylinder while the elastic parts are kept compressed; and
    fastening the elastic parts to the inner member and the outer cylinder.

2. The method of claim 1 wherein,
    the elastic parts include a first elastic part and a second elastic part each made of a different material.

3. The method of claim 1, wherein
    the fastening further includes:
    applying, carried out before the press-fitting, in which an adhesive is applied to at least one of (i) a fastening surface between the inner member and the elastic parts or (ii) a fastening surface between the outer cylinder and the elastic parts, and dried; and
    curing the adhesive after the press-fitting.

4. The method of claim 1 wherein, the elastic parts are positioned with respect to the inner member before press-fitting the inner member and the elastic parts integrally into the outer cylinder.

\* \* \* \* \*